ically sealed package and method of making

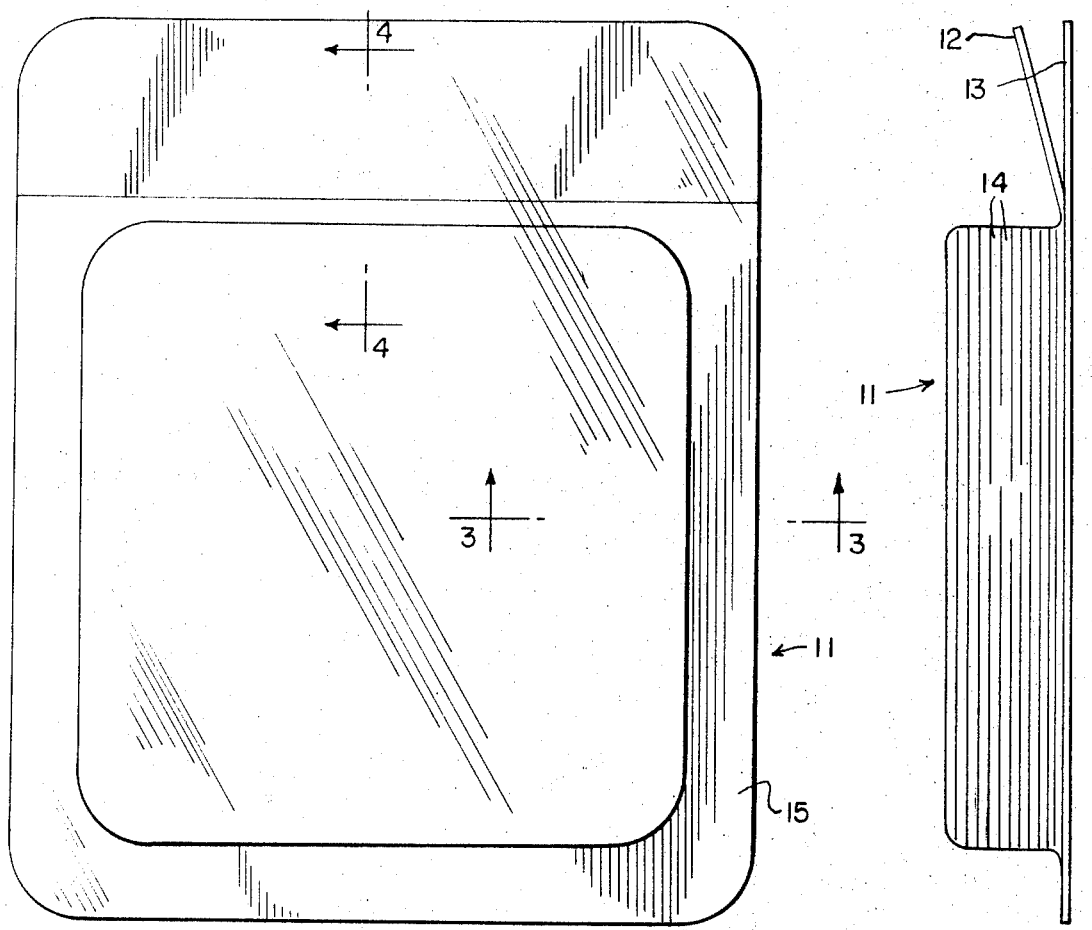
Fig. 1. Fig. 2.
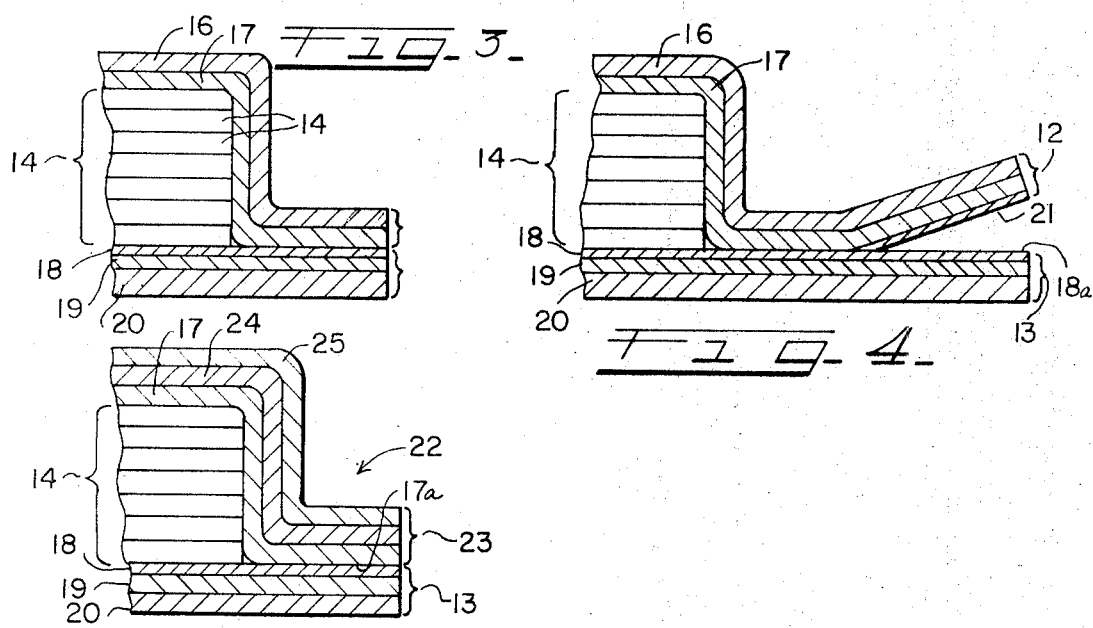
Fig. 3. Fig. 4.
Fig. 5.

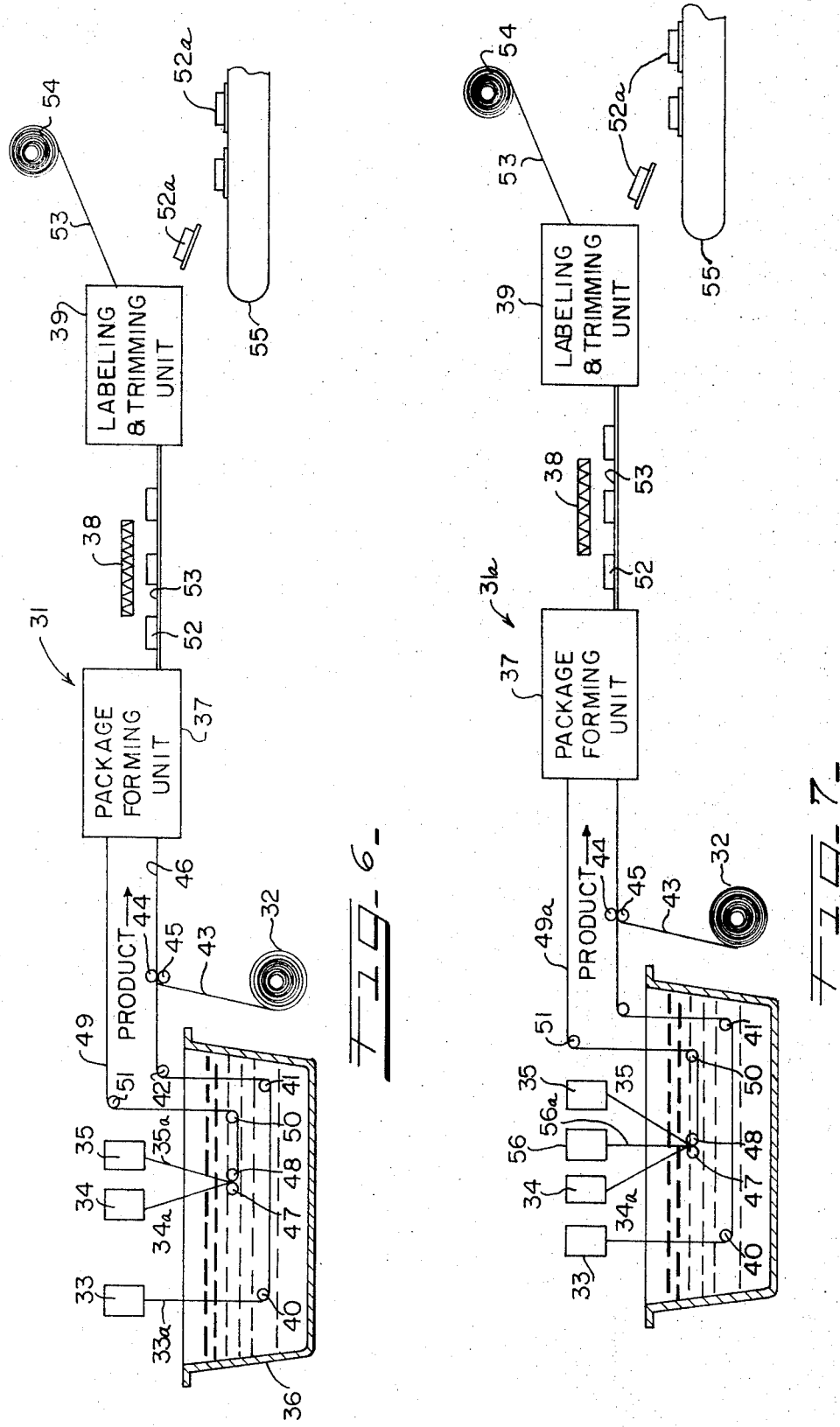

United States Patent Office 3,836,679
Patented Sept. 17, 1974

3,836,679
PACKAGE AND METHOD OF MAKING SAME
Oscar E. Seiferth, Robert L. Goller, and Paul E. Grindrod, Madison, and Harry L. Radloff, Sun Prairie, Wis., assignors to Oscar Mayer & Co., Inc., Madison, Wis.
Continuation-in-part of application Ser. No. 754,361, Aug. 21, 1968, now Patent No. 3,647,485. This application Feb. 7, 1972, Ser. No. 223,986
The portion of the term of the patent subsequent to Mar. 7, 1989, has been disclaimed
Int. Cl. B65b 25/06
U.S. Cl. 426—126                                    20 Claims

ABSTRACT OF THE DISCLOSURE

A hermetically sealed package and method of making the same which includes a breakaway or peelable seal formed between the respective seal forming surfaces of first and second sheets of packaging material. The first sheet of packaging material includes a seal forming surface which consists essentially of a saran film or coating having a suitable oxygen barrier film, for example, a saran film of 85% vinylidene chloride and 15% vinyl chloride, adhered to the surface of the saran film or coating which is opposite its seal forming surface. The second sheet of packaging material has a seal forming surface which consists essentially of an ethylene-polar monomer copolymer film or coating, for example, an ethylene-vinyl acetate film or coating, having a metallic foil, for example aluminum foil, adhered to the surface of the ethylene-polar monomer film or coating which is opposite its seal forming surface. The foil lamina is, in turn, adhered to a suitable backing member, for example a sheet of paperboard or similar material. Preferably, during seal formation, the seal interface is heated to a temperature below the melt temperatures of the film materials which make up the seal, for example from 80° F. to 200° F., to provide improved sealing without destroying the breakaway property or peelability of the seal so formed.

---

This application is a continuation-in-part of our copending application Ser. No. 754,361, filed Aug. 21, 1968 and entitled "Improved Package and Method of Making Same," now U.S. Letters Patent No. 3,647,485.

The present invention generally relates to improved packages and methods of making the same which are characterized by hermetic seals that can be readily separated when access to the product is desired. More particularly, this invention is concerned with a new and improved package having a hermetic or peelable seal formed between a saran film or coating and an ethylene-polar monomer copolymer film or coating adhered to a foil lamina which, in turn, is bonded to a suitable backing member such as, for example, a paperboard sheet.

An important embodiment of the present invention is specifically directed to a hermetic package for food products such as, for example, luncheon meat, weiners, sausage, bacon, cheeses and the like, which is characterized by an improved peelable or breakaway seal formed between a saran film or coating and an ethylene-vinyl acetate copolymer (hereinafter referred to as EVA) film or coating formed by initially contacting the saran with the EVA while the saran is in an amorphous or supercooled state. The surface of the EVA film or coating opposite the seal forming surface thereof is adhered to a foil lamina, preferably aluminum foil, which, in turn, has a suitable backing member, for example a cellulosic fiber layer such as a sheet or layer of lightweight paper stock or paperboard. Typically, the foil is adhered to the backing member by means of an adhesive of the type which are well known in the art. The surface of the saran film or coating opposite the seal forming surface thereof is likewise bonded to a suitable oxygen barrier film such as, for example, a compounded saran film with a polyvinyl chloride content of 15% or less, by weight. Desirably, controlled amounts of heat, below the melt temperatures of the film materials constituting the package, can be applied to the seal area at the time of seal formation to improve the tenacity of the seal so formed without destroying its breakaway property or peelability.

As used in the specification, the term "breakaway seal" is used to define a seal wherein, at the time the seal is broken, either of the film materials which make up the seal separate either partially or entirely from the substrates to which they were respectively applied. The term "peelable seal" is used to denote a seal wherein both of the film materials which make up the seal, on seal separation, remain intact on the substrates to which they were respectively applied.

Packages embodying the present invention are provided with a peelable or breakaway seal without the use of a plasticizer or a pressure sensitive adhesive. In general, this seal is formed between a saran film and an ethylene-polar monomer copolymer film or coating wherein the polar monomer content ranges from approximately 10% to 40% by weight. While ethylene-vinyl acetate copolymer is a preferred film material for practicing the present invention, other ethylene polar monomer copolymer materials such as, for example, ethylene-isobutyl acrylate copolymer and ethylene-ethyl acrylate, copolymer film materials will likewise produce the advantageous breakaway or peelable seal when combined with a saran film in accordance with the present invention.

As previously noted, in the preferred form of the present invention which is employed in packaging food products or other items which deteriorate upon contact with air, a suitable oxygen barrier film or coating is adhered to the saran film. In general, oxygen barrier films which can be advantageously combined with the saran film preferably are transparent films which have an oxygen transmission rate of from 0 to 10 cubic mentimeters per 100 square inches per 24 hours per mil thickness at 77° F. and 760 mm. Hg.

The improved packages of the present invention can be formed with a seal which closely conforms to the shape of the product contained therein. Such a product-conforming seal results in the product being fixedly positioned within the package, thereby substantially minimizing damage to the package during shipment and avoiding the unsightly appearance produced by the free movement of water and food product juices loosely contained within the package. In addition, the amount of residual oxygen present in these packages is substantially reduced since they are provided with maximum seal area which closely conforms to the product size.

It is, therefore, an important object of the present invention to provide an improved package and method of making the same, which package is characterized by a peelable or breakaway hermetic seal formed between a saran film or coating and an ethylene-polar monomer copolymer film or coating which is adhered to a suitable metallic foil lamina such as, for example, an aluminum foil lamina.

Another object of the present invention is to provide an improved package and method of making the same, which package is characterized by a peelable or breakaway hermetic seal formed between a saran film or coating and an ethylene-polar monomer copolymer film or coating which is adhered to a metallic foil lamina which metallic foil lamina in turn is bonded to a suitable backing member.

Another object of the present invention is to provide an improved flexible backed package and method of making the same, which package is characterized by a hermetic peelable or breakaway seal formed between a saran film and an ethylene-polar monomer copolymer film or coating which is bonded to a suitable flexible backing member such as, for example, one formed of a metallic foil and lightweight paper stock.

Another object of the present invention is to provide a new and improved package and method of making the same, which package is characterized by a peelable or breakaway hermetic seal formed between a saran film or coating and an EVA film or coating which is adhere to a metallic foil lamina such as, for example, an aluminum foil lamina.

Another object of the present invention is to provide an improved package and method of making the same, which package is characterized by a peelable or breakaway hermetic seal formed between a saran film or coating and an EVA film or coating having a vinyl acetate content of from 10% to 40% by weight which EVA film or coating is adhered to a metallic foil lamina such as, for example, an aluminum foil lamina.

Another object of the present invention is to provide a new and improved package and method of making the same, which package has a peelable or breakaway hermetic seal formed between a saran film and an ethylene-polar monomer copolymer film or coating which is adhered to a foil lamina, which hermetic or breakaway seal is formed by initially contacting the ethylene-polar monomer copolymer film with the saran film while the saran film is in an amorphous or supercooled state.

Another object of the present invention is to provide a new and improved package and method of making the same, which package has a peelable or breakaway hermetic seal formed between a saran film and an ethylene-polar monomer copolymer film or coating adhered to a foil lamina, which hermetic or breakaway seal was formed by contacting the ethylene-polar monomer copolymer film or coating with a saran film while simultaneously heating the seal interface therebetween to a temperature which is sufficiently high to provide improved seal tenacity but which temperature is below the melt temperature of the films forming the seal.

These and other objects of the present invention will be apparent from the following detailed description thereof taken in conjunction with the accompanying drawings wherein:

FIG. 1 is a plan view of a luncheon meat package embodying principles of the present invention;

FIG. 2 is a side elevational view of the package shown in FIG. 1;

FIG. 3 is an enlarged fragmentary sectional view of the package shown in FIG. 1 taken along the line 3—3 of FIG. 1;

FIG. 4 is an enlarged fragmentary sectional view of the package shown in FIG. 1 taken along the line 4—4;

FIG. 5 is an enlarged fragmentary sectional view similar to the view shown in FIG. 3 of a modified package embodying principles of the present invention;

FIG. 6 is a diagrammatic illustration of a film extruding and packaging apparatus which can be used in making packages of the present invention of the general type illustrated in FIGS. 1-4; and FIG. 7 is a diagrammatic illustration of a film extruding and packaging apparatus which can be used in making packages of the present invention of the general type shown in FIG. 5.

Referring to the drawings and with particular reference to FIGS. 1-5, the reference numeral 11 generally designates a package constructed in accordance with the preferred embodiment of the present invention. As shown, package 11 is formed of upper and lower sheets of packaging material 12 and 13 which are preferably combined about a plurality of luncheon meat slices 14 to form a continous edge seal 15 therealong. As is illustrated, the upper layer of packaging material 12 is drawn about the product 14 to conform to the general contour thereof and thereby provide the overall package with a surface conforming configuration without any folds or pleats which represent potential problems insofar as they are locations wherein leakage and contamination can occur.

As is best shown in FIGS. 3 and 4, the top layer of packaging material 12 includes an outer film 16 laminated to an inner film lamina 17 which, in accordance with the present invention, is composed of a saran film or coating (i.e. a polyvinylidene chloride-vinyl chloride copolymer film wherein the vinylidene chloride content thereof predominates). Suitable films which can be used for lamina 16 include polyvinyl chloride films and ethylene-vinyl acetate copolymer films having a relatively low vinyl acetate content. Other film materials exhibiting properties similar to these particular films can be substituted in place thereof in film lamina 16.

In accordance with the present invention, the lower sheet of packaging material 13 includes an upper lamina 18 which is composed of a copolymer film material formed from a mixture of ethylene and a polar monomer in which the polar monomer content is in the range of 10% to 40% by weight. In the illustrated embodiment, lamina 18 is composed of an EVA copolymer film material having a vinyl acetate content of from 10% to 40% by weight, with a vinyl acetate content of from 10% to 30% by weight being preferred and the vinyl acetate content of from 15% to 20% being especially suitable for use in conjunction with saran in a food product package. Lamina 18 is bonded to a metallic foil lamina 19, preferably aluminum foil, which in turn is bonded to a suitable backing member 20, for example, a cellulosic fiber layer such as paperboard or lightweight paper stock.

Ready separation of the top sheet of packaging material 12 from the lower sheet of packaging material 13 is achieved through the provision of an insert 21 in the form of a coating paper or laminated material which does not bond with the upper surface 18a of the ethylene-polar monomer copolymer film or coating lamina 18. As is best shown in FIGS. 1 and 4, insert 21 is located adjacent one end of the package 11 and enables the breakaway or peelable seal thereof to be readily opened without the use of a cutting implement.

The saran lamina 17 used in the upper sheet of packaging material 12 exhibits a so-called "supercooled" or amorphous state which can be advantageously utilized to enable the film lamination or sheet 12 to be readily formed about a product being packaged. The properties and method of inducing this amorphous condition are fully described in co-owned United States Letters Patent No. 3,083,106, No. 3,189,505, and No. 3,131,069, among others the disclosures of which are incorporated herein by reference thereto. In particular, these unique supercooled properties are induced by immediately supercooling the film following extrusion by passing them through a water bath maintained at a temperature of from 35° F. to 100° F. This amorphous condition can then be maintained until the combination of time and temperature produce crystallization therein.

Improved tenacity of the seal formed between the upper layer of packaging material 12 and the lower layer of packaging material 13 can be achieved by heating the seal interface, at the time of seal formation, to a temperature of from approximately 80° F. to 200° F. which temperature is below the melt temperature of any of the film materials used in the package. This heating step advantageously promotes increased seal tenacity without destroying the peelable or breakaway characteristics of the seal thus formed. The use of such a heating step is readily distinguishable from conventional heat seal techniques in that with conventional heat seal techniques it is necessary to heat at least one of the materials at the interface of the seal to a temperature above its melting point in order to induce fusing thereof to the other material making up the heat seal.

FIG. 5 generally illustrates a package 22 representing a modified form of the present invention wherein like reference numerals have been used to designate similar elements. As is shown, package 22 includes a lower sheet or layer of packaging material 13 which is identical to that previously described in conjunction with the package 11 shown in FIGS. 1–4. Package 22 also includes an upper layer or sheet of packaging material 13 having an inner lamina 17 which is composed of a saran film similar to that previously discussed. Opposite the seal forming surface 17a of lamina 17 is an intermediate lamina 24 which imparts improved flexibility and strength to the layer or sheet of packaging material 23. Typically, intermediate lamina 24 can desirably be either an EVA film having a vinyl acetate content greater than 30% by weight or other suitable film such as a chlorinated polyethylene or a compounded polyvinyl chloride film. Outer lamina 25 is preferably composed of a suitable oxygen barrier film such as, for example, an oxygen barrier polyvinylidene chloride-vinyl chloride copolymer. It will be appreciated however, that other film materials may be substituted for the film laminae 24 and 25 without departing from the spirit and scope of this invention.

FIG. 6 generally illustrates a continuous film-extruding and package-forming apparatus 31 which can be employed in the manufacture of packages employing principles of the present invention. As is shown, apparatus 31 generally includes a supply roll 32 and film extruders 33, 34 and 35, a supercooling bath 36, package forming component 37, heater 38 and combination labeling and trimming unit 39.

Extruder 33 contains suitable resin material for forming an ethylene-polar monomer copolymer film material 33a which, upon being extruded, is received in the supercooling bath 36 and directed by guide rollers 40, 41 and 42 into contact with a web 43 of metallic foil coated paper from supply roll 32. Web 43 and film 33a are combined between a pair of laminating rollers 44 and 45 and thereafter introduced as a layer of packaging material 46 into the package forming unit 37. Simultaneously, extruders 34 and 35 respectively extrude a saran film 34a and a suitable oxygen film 35a into the supercooling bath 36. Films 34a and 35a are combined between laminating rollers 47 and 48 to provide an upper layer or sheet of packaging material 49 which is directed around guide rollers 50 and 51 into the package forming unit 37. In this regard, it will be appreciated that upper sheet or layer of packaging material 49 will correspond to the upper layer of packaging material 12 in the package shown and described in conjunction with FIGS. 1–5 and that lower sheet or lamination 46 would generally correspond to the lower sheet of packaging material 13 in the same package.

The supercooling bath is preferably maintained at a temperature of from approximately 35° F. to 100° F. When reduced to this temperature, the saran lamina 34a achieves the previously mentioned "supercooling" state.

A series of products to be packaged are fed into the package forming unit 37 between the sheets of packaging material 49 and 46. Package forming unit 37 can be constructed in accordance with known techniques for handling the particular films involved. For example, a description of suitable package forming units for handling saran films is set forth in detail in co-owned United States Letters Patent No. 3,083,106 and 3,129,545, the disclosures of which are incorporated herein by reference thereto.

Individual product enclosing packages 52 emerge from package forming unit 37 in a chain joined by a continuous web 53. These packages can then be heated by a suitable heating element 38 to effect crystallization of the saran lamina 34a. By way of example, the temperature of the saran lamina 34a in the package can be raised to a temperature of 150° F. for this purpose. It will be appreciated, however, that such crystallization can also be obtained by permitting the packages to be stored at room temperature for an exended period of time.

The packages upon being thus formed are received in a combination labeling and trimming unit 39 wherein labels can be applied thereto and wherein they can be separated from the web 53 which is received upon a suitable collecting roll 54. The seaparated packages 52a are then discharged from the unit 39 onto a conveyor 55 in condition for further handling, storage, or direct shipping.

In FIG. 7, a modified apparatus 31a is shown with like reference numerals being used to designate components which are identical to and operate in the same manner as those components shown and described in conjunction with the apparatus 31 of FIG. 6. In this regard, however, it will be noted that the upper film lamination 49a is a three ply lamination having an inner saran lamina 35 and an outer oxygen barrier film lamina 35a which are separated by an intermediate lamina 56a which is extruded from a film extruder 56. Intermediate lamina 56a is generally similar to the intermediate lamina 24 of the embodiment described in conjunction with the package 22 shown in FIG. 5 and, as such, is employed to impart improved flexibility and strength to the upper film lamination 49a.

While certain embodiments of the present invention have been described in detail, it will be apparent that certain modifications and variations thereof can be made without departing from the spirit and scope of this invention. Accordingly, only such limitations are to be imposed on this invention as are indicated in the appended claims.

We claim:

1. A package comprising a product enclosed between first and second sheets of packaging material, said first and second sheets each having respective seal forming surfaces which are releasably adhered to each other without an adhesive layer therebetween to define a hermetic seal which can be readily separated when access to said product is desired, said seal forming surface of said first sheet consisting essentially of a layer of saran film, said seal forming surface of said second sheet consisting essentially of a copolymer film material formed from a mixture of ethylene and a polar monomer in which the polar monomer content is in the range of 10% to 40% by weight, said second sheet of packaging material also including a layer of metallic foil which is adhered to the surface of said copolymer film material opposite the seal forming surface thereof.

2. The package of claim 1 wherein said polar monomer is selected from the group consisting of vinyl acetate, isobutyl acrylate and ethyl acrylate.

3. The package of claim 1 wherein said hermetic seal is heated to a temperature of from 80° F. to 200° F. at the time said ethylene-polar monomer copolymer film material is adhered to said saran layer.

4. The package of claim 1 wherein said saran film of the seal forming surface of said first sheet of packaging material was adhered to said seal forming surface of said second sheet of packaging material while said saran film was in an amorphous supercooled condition.

5. The package of claim 1 wherein said copolymer film material is an ethylene-vinyl acetate copolymer film material having a vinyl acetate content of from 10% to 30% by weight.

6. The package of claim 5 wherein the vinyl acetate content of said ethylene-vinyl acetate copolymer film material is from approximately 15% to 20% by weight.

7. A package comprising a food product enclosed between first and second sheets of packaging material, said first and second sheets having respective seal forming surfaces which are releasably adhered to each other without an adhesive layer therebetween to define a hermetic seal which can be readily separated when access to said product is desired, said seal forming surface of said first sheet consisting essentially of a layer of saran film, said first sheet also including a layer of an oxygen barrier material which is adhered to the surface of said saran film opposite the seal forming surface thereof, said seal forming surface of said second sheet consisting essentially of an ethylene-polar monomer copolymer film material in which the polar monomer content is in the range of 10% to 40% by weight, said second sheet of packaging material also including a layer of metallic foil having a first surface which is adhered to the surface of said ethylene-monomer copolymer film material opposite the seal forming surface thereof and a second surface which is adhered to a cellulosic fiber layer.

8. The package of claim 7 wherein said polar monomer is selected from the group consisting of vinyl acetate, isobutyl acrylate, and ethyl acrylate.

9. The package of claim 7 wherein said hermetic seal was heated to a temperature of from 80° F. to 200° F. at the time said ethylene-polar monomer copolymer film material was adhered to said saran film.

10. The package of claim 7 wherein said saran film of the seal forming surface of said first sheet of packaging material was adhered to said seal forming surface of said second sheet of packaging material while said saran film was in an amorphous supercooled condition.

11. The package of claim 7 wherein said ethylene-polar monomer film materal is an ethylene-vinyl acetate copolymer film material.

12. The package of claim 11 wherein said ethylene-vinyl acetate copolymer film material has a vinyl acetate content of from approximately 10% to 30% by weight.

13. The package of claim 11 wherein said ethylene-vinyl acetate copolymer film material has a vinyl acetate content of from approximately 15% to 20% by weight.

14. A method of enclosing a product between first and second sheets of packaging material, said method comprising the steps of: inserting a product between first and second sheets of packaging material; and, contacting said first and second sheets with each other to define a hermetic seal which surrounds said product, said first and second sheets having respective seal forming surfaces which are releasably bonded to each other without an adhesive layer therebetween and which can be readily separated when access to said product is desired, said first sheet of packaging material having the seal forming surface thereof consisting essentially of a layer of saran film, said second sheet of packaging material having the seal forming surface thereof consisting essentially of a copolymer film material formed from a mixture of ethylene and a polar monomer in which the polar monomer content is in the range of 10% to 40% by weight, said second sheet of packaging material also including a layer of metallic foil which is adhered to the surface of said copolymer film material opposite the seal forming surface thereof.

15. The method of claim 14 wherein said saran film and said ethylene-polar monomer copolymer film material at said hermetic seal are heated to a temperature of from about 80° F. to 200° F. at the time of forming said hermetic seal, whereby the tenacity of the seal is improved without destroying the breakaway property or peelability thereof.

16. The method of claim 14 wherein said polar monomer is selected from the group consisting of vinyl acetate, isobutyl acrylate and ethyl acrylate.

17. The method of claim 14 wherein said saran film of the seal forming surface of said first sheet of packaging material is in an amorphous supercooled state when initially contacted with said ethylene-polar monomer copolymer film of the seal forming surface of said second sheet of packaging material.

18. The method of claim 14 wherein said ethylene-polar monomer copolymer film is an ethylene-vinyl acetate copolymer film.

19. The method of claim 18 wherein said ethylene-vinyl acetate copolymer film material has a vinyl acetate content of from about 10% to 30% by weight.

20. The method of claim 18 wherein said ethylene-vinyl acetate copolymer film material has a vinyl acetate content of about 15% to 24% by weight.

References Cited

UNITED STATES PATENTS

| | | | |
|---|---|---|---|
| 3,647,485 | 3/1972 | Seiferth | 99—174 |
| 3,228,168 | 1/1966 | Grindrod et al. | 99—171 S X |
| 3,131,069 | 4/1964 | Goller et al. | 99—171 P X |

OTHER REFERENCES

Modern Packaging Encyclopedia, 1968, McGraw-Hill, p. 149.

FRANK W. LUTTER, Primary Examiner

S. L. WEINSTEIN, Assistant Examiner

U.S. Cl. X.R.

426—129, 415

UNITED STATES PATENT OFFICE
CERTIFICATE OF CORRECTION

Patent No. 3,836,679    Dated September 17, 1974

Inventor(s) O. E. Seiferth et al.

It is certified that error appears in the above-identified patent and that said Letters Patent are hereby corrected as shown below:

Col. 2, line 40, "mentimeters" should read --centimeters--
Col. 3, line 11, "adhere" should read --adhered--
Col. 5, line 8, "13" should read --23--
Col. 5, line 41, after "oxygen" insert --barrier--
Col. 6, line 3, "seaparated" should read --separated--
Col. 8, line 28, "24%" should read --20%--

Signed and sealed this 17th day of December 1974.

(SEAL)
Attest:

McCOY M. GIBSON JR.
Attesting Officer

C. MARSHALL DANN
Commissioner of Patents